March 10, 1953     A. A. GUMBS     2,630,986
WING CONTROL FOR AIRCRAFT
Filed Jan. 25, 1949     2 SHEETS—SHEET 1
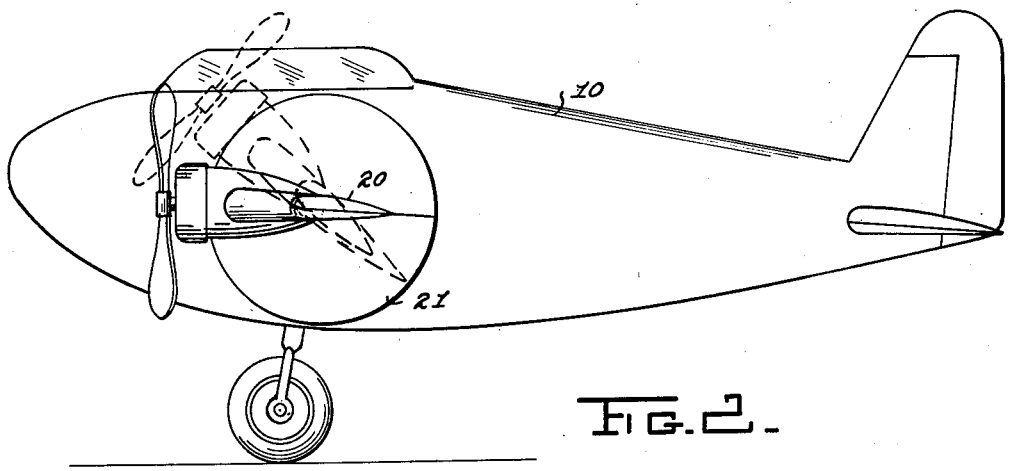
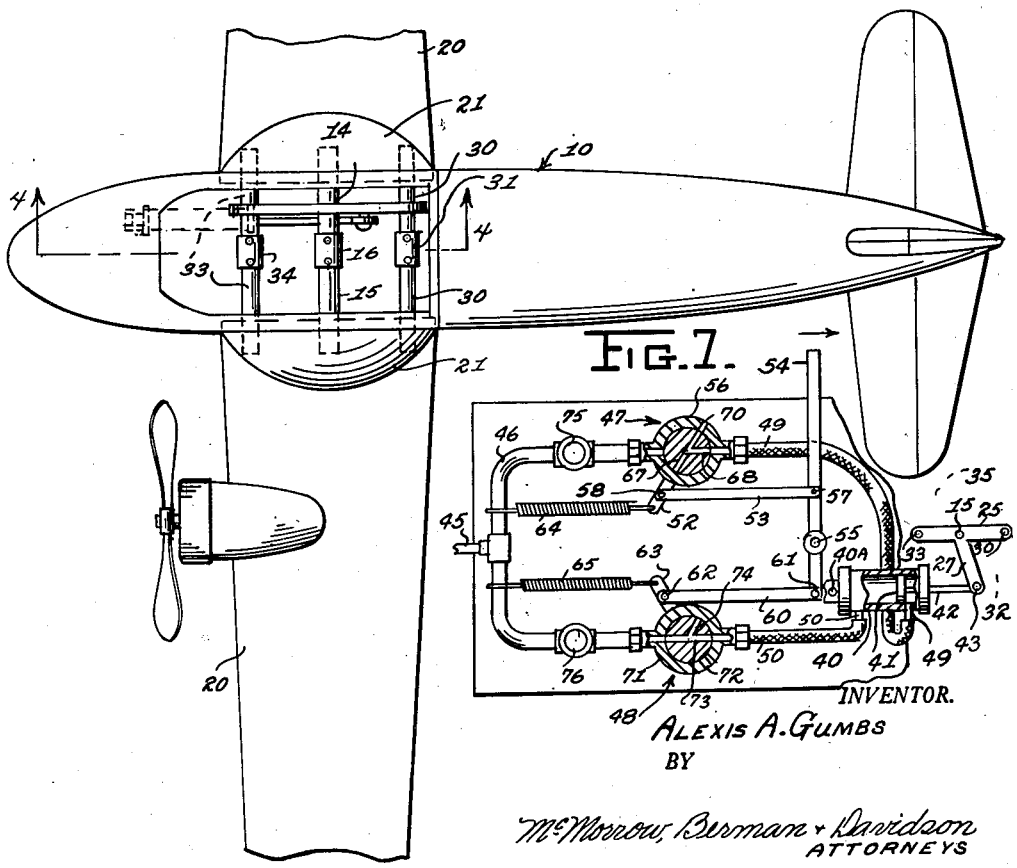
INVENTOR.
ALEXIS A. GUMBS
BY
McMorrow, Berman & Davidson
ATTORNEYS March 10, 1953 A. A. GUMBS 2,630,986
WING CONTROL FOR AIRCRAFT
Filed Jan. 25, 1949 2 SHEETS—SHEET 2
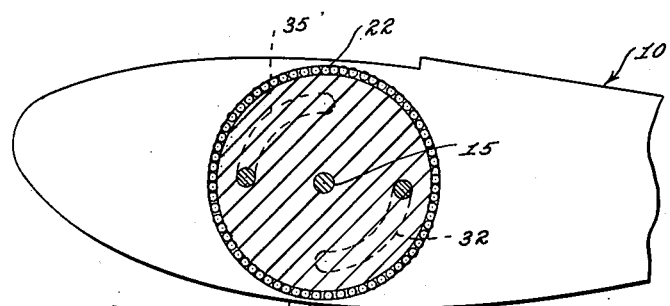
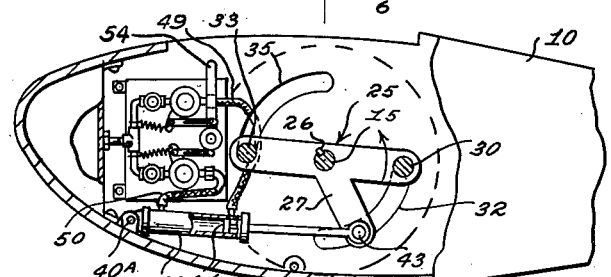
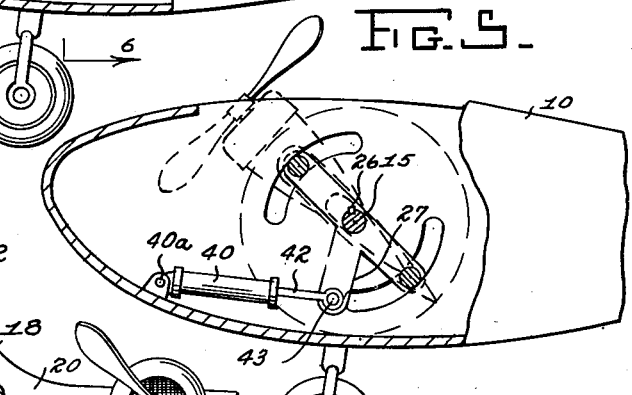
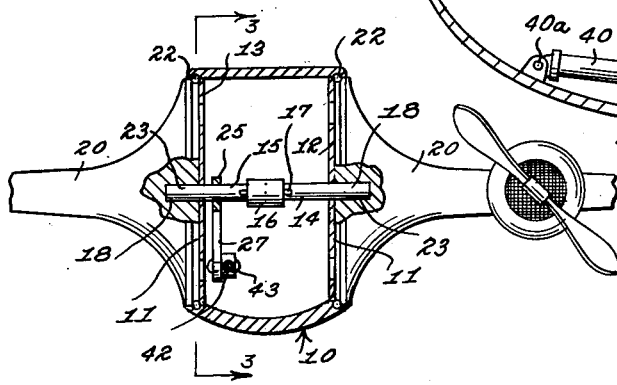
INVENTOR.
ALEXIS A. GUMBS
BY
McMorrow, Berman & Davidson
ATTORNEYS Patented Mar. 10, 1953

2,630,986

UNITED STATES PATENT OFFICE 2,630,986

WING CONTROL FOR AIRCRAFT

Alexis A. Gumbs, St. Nicolas, Aruba,
Netherlands West Indies

Application January 25, 1949, Serial No. 72,677

1 Claim. (Cl. 244—48)

This invention relates to aircrafts and is more particularly directed to a control for the wings thereof.

An object of the invention is the provision of a wing construction for aircraft in which the wings are tiltably mounted on their major axes for varying the angle of incidence relative to the speed of the plane and also while ascending or descending, the inner ends of the wings being received by sockets at opposite sides of the fuselage and connected together by an axial shaft in the fuselage with rods further connecting the inner ends of the wings together at opposite sides of the shaft and movable through arcuate slots in the side walls of the fuselage, said slots and rods cooperating to limit tilting of the wings.

A further object of the invention is the provision of a wing construction for aircraft in which the wings projecting laterally from the fuselage may be rocked on their major axes through a predetermined number of degrees by an hydraulically actuated piston rod attached to a lever which in turn is rigid with a shaft mounted in bearings carried by the opposite side walls of the fuselage. The ends of the shaft being secured in the adjacent inner ends of the wings, rods passing through arcuate slots formed in the side walls of the fuselage and further connecting the inner ends of the wings together, the ends of the slots cooperating with the rods to limit tilting of the wings.

The invention is best understood from a consideration of the following detailed description in connection with the accompanying drawings, nevertheless, it is to be understood that the invention is not confined to the disclosure but is susceptible of such changes and modifications as shall define no material departure from the salient features of the invention as expressed in the appended claim.

In the drawings—

Figure 1 is a longitudinal side view of an aircraft showing my improved wing construction applied thereto, Figure 2 is a fragmentary plan view of the aircraft showing how the wings are connected together for rocking movement, Figure 3 is a transverse vertical section of a wing taken along the line 3—3 of Figure 6, Figure 4 is a fragmentary vertical longitudinal section taken along the line 4—4 of Figure 2, Figure 5 is a fragmentary side view of the aircraft with parts of the fuselage broken away to show the operating elements for tilting the wings, Figure 6 is a fragmentary transverse vertical section through the wings and fuselage taken along the line 6—6 of Figure 4, and Figure 7 shows more or less diagrammatically an hydraulic operating means for actuating the tilting means for the wings and showing the valves in section.

Referring more particularly to the drawings 10 designates the fuselage of an aircraft having oppositely disposed circular sockets 11 formed in side walls 12 and 13 of said fuselage. These side walls, circular in shape, are formed of metal. A pair of aligned shafts 14 and 15 having their inner abutting ends connected together by a sleeve 16 and a key 17. The outer ends 18 of said shaft are provided with bearings in the centers of the circular side walls 12 and 13 and project outwardly from the side walls.

Each wing 20 has a circular enlargement 21 received by a socket 11 and ball bearings 22 at the peripheries of the enlargements provide for a smooth rocking movement of the enlargements in the sockets. The outer projecting ends 18 of the shafts 14 and 15 are received by passages 23 formed in the inner ends of the wings and in longitudinal alignment with the major axes of the wings 20. These ends are rigid with the wings.

An operating arm 25 has the intermediate portion received by the shaft 15 and is keyed at 26 to said shaft (Figure 4). A lever 27 projects downwardly from the intermediate portion of the arm and is adapted to rock not only the arm and connected shafts but also the wings 20 on the major axes thereof.

A pair of aligned rods 30 have the inner abutting ends joined by a sleeve 31 (Figure 2) and a key. Said rods project through arcuate slots 32 formed in the side walls 12 and 13 and are received by pockets in the enlargements 21 of the wings. The outer ends of said rods are fixed rigidly in the pockets. A second pair of aligned rods 33 have the inner ends thereof connected together by a sleeve 34 and a key. Thus, since the shafts 14, 15, the rods 30 and 33 have the outer ends secured rigidly in the inner ends of the wings 20 while the inner ends of the shafts are connected together by a sleeve and a key as are the inner ends of the rods, the wings may be released from the fuselage by the removal of the various connecting sleeves and keys. The rods 33 extend in opposite directions through adjacently disposed arcuate slots 35 in the respective side walls 12 and 13.

A mechanism for rocking the lever 27 is shown more particularly in Figures 4 and 7 and is established in the nose of the fuselage. A cylinder 40 has one end pivoted at 40a on the bottom of the fuselage. A piston 41 is movable in said cylinder for operating a rod 42 projecting from the other end of said cylinder. The outer end of the rod is connected pivotally at 43 with the lower free end of the lever 27.

A pipe 45 supplies fluid under pressure to a pipe 46 which has connections with a valve 47 and a valve 48. A pipe 49 connects the valve 47 with the inner free end of the cylinder 40 while a pipe 50 connects the outer or pivoted end of said cylinder with the valve 48. When fluid enters the pipe 50, the piston will be moved towards the inner end of the cylinder for rocking the lever 27, the shafts 14, 15 and the wings on their major axes in the direction indicated by the arrow in Figure 4. At this time, the wings are in normal flying positions. When fluid under pressure is admitted to the pipe 49 the elements just enumerated are rocked in the oppoiste direction to tilt the wings at an angle to the normal.

A lever 52 (Figure 7) rocks the valve 47 through a link 53 and a lever 54 which is pivoted at 55 on a fixed support. The link 53 has one end pivoted at 57 on the lever 54 while the other end thereof has a pivotal connection 58 with the lever 52. A link 60 is pivoted at 61 to the lower end of the lever 54 and has a pivotal connection 62 with a lever 63. A coil spring 64 connected between the pipe 46 and the lever 52 and a spring 65 connected between said pipe and the lever 63, tend to maintain the valve 48 open and the wings in normal flying positions.

The valve 47 has a passage 67 adapted to align with the pipes 46 and 49 through diametrically disposed ports in the valve casing 56. A branch passage 68 communicating with the passage 67 is adapted to align with the pipe 49 while one end of the passage 67 aligns with an exhaust port 70 to relieve air pressure in the inner end of the cylinder 40.

The valve 48 is mounted in a valve casing 71 which has an exhaust port 72 for relieving pressure in the pivoted end of the cylinder 40 when a diametrically disposed passage 73 is out of alignment with the pipes 46 and 50 and a branch passage 74 communicating with the passage 73 is aligned with the port 72. As shown, however, in Figure 7, the passage 73 is aligned with the pipes 46 and 50 and compressed air is supplied to the outer end of the cylinder 40 for maintaining the rods 30 and 33 in a horizontal plane with the shafts 14 and 15 for normal flying conditions. Check valves 75 and 76 are incorporated in the arms of the pipe 46.

During normal flying the valves 47 and 48 are in the positions shown in Figure 7. In taking off, the positions of the valves are reversed and the lever 54 is moved in the direction indicated by the arrow and the passage 67 is aligned with the pipes 46 and 49 for supplying compressed air to the inner end of the cylinder 40 while the passage 73 of the valve 48 is aligned with the exhaust passage 72 and the branch passage 74 is aligned with the pipe 50 so that the air in the pivoted end of the cylinder 40 is exhausted. The rod 42 will pull the lever 27 towards the piston 40 and the rods 30 and 33 will be shifted to the opposite ends of the respective arcuate slots 32 and 35. The wings 20 are tilted at this time to the dotted line position shown in Figure 1 for a quick take-off.

By removably connecting the inner ends of the pairs of the sections of the rods 30 and 33 and the pair of aligned shafts 14 and 15, said sections and shafts may be readily released and the wings are withdrawn. In this manner, the aircraft may be stored in a small space.

What I claim:

In an aircraft, a fuselage having circular sockets disposed one at each side thereof and having their centers on a common axis extending transversely of said fuselage, said fuselage also having bearing apertures in the sides thereof concentric with the corresponding sockets and arcuate slots in each socket concentric with the corresponding bearing apertures and disposed at diametrically opposite sides of the latter, wings having enlarged formations of circular shape on the butt ends thereof received, one formation in each of said sockets, for rotation therein, antifriction bearings disposed between the edges of said wing formations and the adjacent surfaces of said sockets, a shaft extending transversely of said fuselage through said bearing apertures and rigidly secured at its respectively opposite ends to the butt ends of said wings, a first rod extending transversely of said fuselage at one side of said shaft and through the corresponding arcuate slots and rigidly secured at its respectively opposite ends to the butt ends of said wings, a second shaft extending transversely of said fuselage at the other side of said shaft and through the corresponding arcuate slots and rigidly secured at its respectively opposite ends to the butt ends of said wings, a lever arm secured to said shaft and said rods within said fuselage, and manually controlled power-actuated means connected between said fuselage and said lever arm for imparting rotational movement to said wings about the axis of said shaft, said shaft, said rods and said sockets maintaining said wings against angular movement relative to each other and against separation from said fuselage.

ALEXIS A. GUMBS.

REFERENCES CITED

The following references are of record in the file of this patent:

UNITED STATES PATENTS

| Number | Name | Date |
|---|---|---|
| 1,478,270 | Trunko | Dec. 18, 1923 |
| 1,746,042 | Kinzel | Feb. 4, 1930 |
| 2,118,987 | Smith | May 31, 1938 |
| 2,152,981 | Taylor | Apr. 4, 1939 |
| 2,362,224 | Roseland | Nov. 17, 1944 |

FOREIGN PATENTS

| Number | Country | Date |
|---|---|---|
| 18,444 | Australia | Feb. 10, 1930 |